United States Patent
Sugai

(10) Patent No.: US 11,842,466 B2
(45) Date of Patent: Dec. 12, 2023

(54) INFORMATION PROCESSING DEVICE AND INFORMATION PROCESSING METHOD

(71) Applicant: CANON KABUSHIKI KAISHA, Tokyo (JP)

(72) Inventor: Takashi Sugai, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 17/411,173

(22) Filed: Aug. 25, 2021

(65) Prior Publication Data

US 2022/0084169 A1    Mar. 17, 2022

(30) Foreign Application Priority Data

Sep. 16, 2020 (JP) .................. 2020-155371

(51) Int. Cl.
  *G06K 9/00* (2022.01)
  *G06T 5/00* (2006.01)
  *G06T 7/70* (2017.01)
  *G06N 3/08* (2023.01)

(52) U.S. Cl.
  CPC ............... *G06T 5/006* (2013.01); *G06N 3/08* (2013.01); *G06T 7/70* (2017.01); *G06T 2207/20081* (2013.01)

(58) Field of Classification Search
  CPC .......................................... G06T 2207/20081
  See application file for complete search history.

(56) References Cited

U.S. PATENT DOCUMENTS

| | | | |
|---|---|---|---|
| 10,430,708 B1* | 10/2019 | Hu ..................... | G06T 11/008 |
| 10,733,705 B2 | 8/2020 | Sakamoto et al. | |
| 2015/0363670 A1 | 12/2015 | Sugishita et al. | |
| 2019/0130591 A1* | 5/2019 | Tanaka .................. | G06T 5/20 |
| 2019/0197669 A1* | 6/2019 | Sakamoto ........... | G06F 18/2185 |
| 2019/0294961 A1* | 9/2019 | Zuev .................... | G06N 3/045 |
| 2019/0311217 A1* | 10/2019 | Tsuji ................... | H04N 23/60 |
| 2020/0334532 A1* | 10/2020 | Zuev .................... | G06V 10/82 |

FOREIGN PATENT DOCUMENTS

| | | |
|---|---|---|
| JP | 2018-120283 A | 8/2018 |
| JP | 2019-117577 A | 7/2019 |
| JP | 2019-125116 A | 7/2019 |

\* cited by examiner

*Primary Examiner* — Hadi Akhavannik
(74) *Attorney, Agent, or Firm* — Venable LLP

(57) ABSTRACT

Provided is an information processing device configured to generate a learning model for performing image recognition on a first image acquired by a first imaging device including an optical system having a first optical characteristic, including: a conversion unit configured to convert a second image for learning to generate a third image having a distortion characteristic based on the first optical characteristic; and a generation unit configured to generate the learning model based on the third image. The second image is an image acquired by a second imaging device including an optical system having a second optical characteristic different from the first optical characteristic.

8 Claims, 11 Drawing Sheets

INPUT LAYER    INTERMEDIATE LAYERS    OUTPUT LAYER

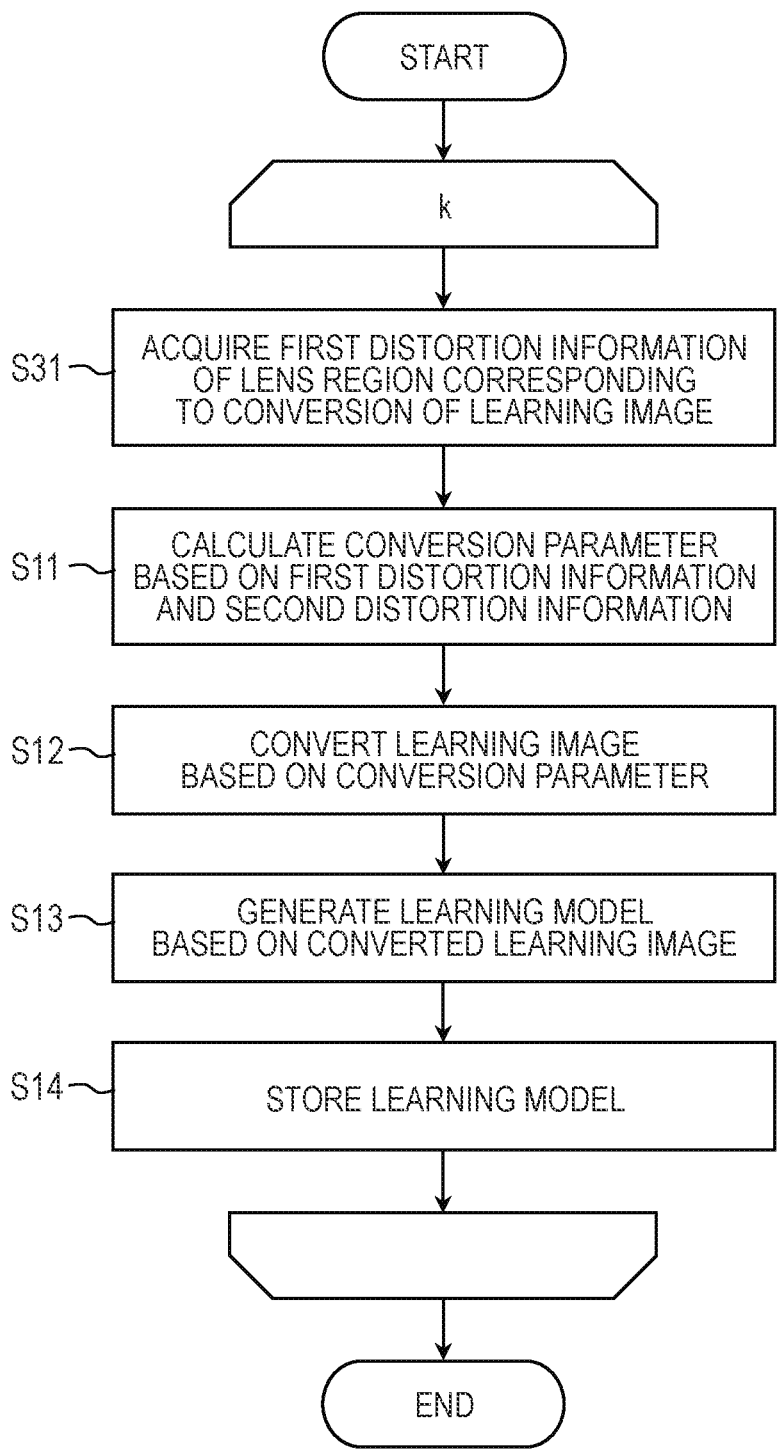

INFORMATION PROCESSING DEVICE AND INFORMATION PROCESSING METHOD

BACKGROUND

Field

The present disclosure relates to an information processing device and an information processing method.

Description of the Related Art

One method of image recognition is to use a learning model generated by machine learning. Japanese Patent Application Laid-Open No. 2019-125116 and Japanese Patent Application Laid-Open No. 2019-117577 disclose techniques relating to recognition of a captured image using a learning model.

Japanese Patent Application Laid-Open No. 2019-125116 discloses a method in which an image to be processed is converted based on an image capturing condition of an image used to generate a learning model and an image capturing condition of the image to be processed, and then input to the learning model.

Japanese Patent Application Laid-Open No. 2019-117577 discloses a method of generating a learning model using an image captured by an imaging device including a lens in which distortion occurs in an object in an image such as a fisheye lens. In this method, data for learning is generated by converting a distorted captured image into a uniform image, then assigning related information, and then converting the uniform image into a distorted image.

In the method disclosed in Japanese Patent Application Laid-Open No. 2019-125116, it is necessary to perform conversion processing on a captured image every time image recognition is performed, so that a processing load at the time of image recognition is large. Therefore, depending on the application, it may be difficult to apply the method of Japanese Patent Application Laid-Open No. 2019-125116.

In the method of Japanese Patent Application Laid-Open No. 2019-117577, the conversion process is performed not at the time of image recognition but at the time of learning, so that the above-described increase in processing load can be reduced. However, since images for learning are captured using an image capturing device for image recognition, the number of images that can be collected is limited, and the accuracy of the learning model may not be sufficiently obtained.

SUMMARY

An object of the present disclosure is to provide an information processing device and an information processing method capable of reducing a processing load and generating a high-accuracy learning model.

According to an aspect of the present disclosure, provided is an information processing device configured to generate a learning model for performing image recognition on a first image acquired by a first imaging device including an optical system having a first optical characteristic, including: a conversion unit configured to convert a second image for learning to generate a third image having a distortion characteristic based on the first optical characteristic; and a generation unit configured to generate the learning model based on the third image. The second image is an image acquired by a second imaging device including an optical system having a second optical characteristic different from the first optical characteristic.

According to another aspect of the present disclosure, provided is an information processing method for generating a learning model for performing image recognition on a first image acquired by a first imaging device including an optical system having a first optical characteristic, including: converting a second image for learning to generate a third image having a distortion characteristic based on the first optical characteristic; and generating the learning model based on the third image. The second image is an image acquired by a second imaging device including an optical system having a second optical characteristic different from the first optical characteristic.

Further features of the present invention will become apparent from the following description of exemplary embodiments with reference to the attached drawings.

BRIEF DESCRIPTION OF THE DRAWINGS

FIG. 10 is a flowchart illustrating an outline of learning processing in an information processing device according to the third embodiment.

DESCRIPTION OF THE EMBODIMENTS

Preferred embodiments of the present invention will now be described in detail in accordance with the accompanying drawings. The same components or corresponding components throughout multiple drawings are labeled with common references, and the description thereof may be omitted or simplified.

First Embodiment

An image recognition system of the present embodiment performs image recognition on a captured image and outputs a recognition result. An example of the application of the image recognition system is an automatic monitoring system that automatically determines whether or not there is a monitoring target within an imaging range. The image recognition system typically realizes real-time image recognition by performing repetitive recognition processing based on a moving image or continuous images.

The image recognition system of the present embodiment has a machine learning function of generating a learning model using learning images. A learned learning model generated by this function is used for the above-described image recognition. The learning images are stored in advance in a database provided in the image recognition system.

Figure 1:
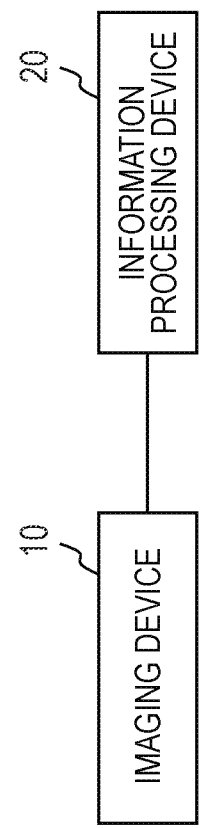
FIG. 1 is a block diagram illustrating an overall configuration of an image recognition system according to a first embodiment.

FIG. 1 is a block diagram illustrating an overall configuration of the image recognition system according to the present embodiment. The image recognition system includes an imaging device 10 and an information processing device 20 communicably connected to each other. The imaging device 10 is a device for acquiring an image by capturing an image of the periphery of a place where the imaging device is installed. The imaging device 10 may be, for example, a surveillance camera, a digital still camera, a digital camcorder, a smartphone, an in-vehicle camera, an observation satellite, or the like. In order to perform wide-range image recognition, the imaging device 10 preferably uses a lens having a wide angle of view such as a fisheye lens. The information processing device 20 is a computer such as a PC or a server, and performs calculation processing such as image processing using an image acquired from the imaging device 10. The information processing device 20 may have a function of controlling the imaging device 10 to perform imaging.

The device configuration of the image recognition system is not limited to that illustrated in FIG. 1. For example, the image recognition system may be an integrated image recognition device having functions of the imaging device 10 and the information processing device 20. At least one of the imaging device 10 and the information processing device 20 may be plural. For example, a plurality of imaging devices 10 may be provided so that a plurality of imaging ranges can be photographed in parallel. In addition, for example, a plurality of information processing devices 20 may be provided so that a plurality of devices cooperate with each other to perform image processing or the like of the present embodiment. The information processing device 20 may be divided into a learning device that generates a learning model and an image recognition device that performs image recognition using the learning model. The image recognition system may further include a device other than the imaging device 10 and the information processing device 20. For example, the image recognition system may further include a control device that controls the entire system, and in this case, the imaging device 10 and the information processing device 20 may perform image recognition processing in accordance with the control of the control device.

Figure 2:
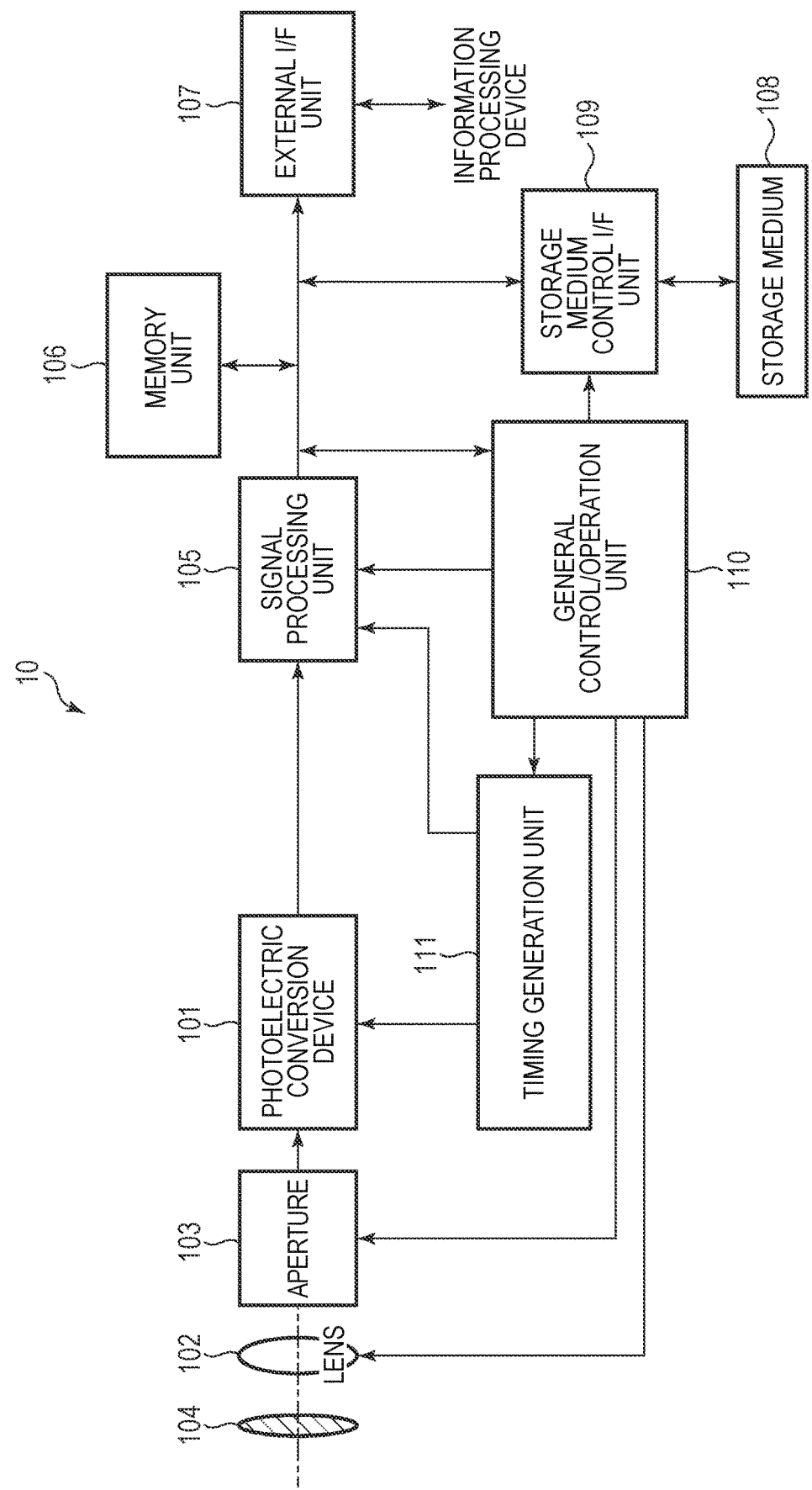
FIG. 2 is a block diagram illustrating a schematic configuration of an imaging device according to the first embodiment.

FIG. 2 is a block diagram illustrating a schematic configuration of the imaging device 10 according to the present embodiment. As shown in FIG. 2, the imaging device 10 includes a photoelectric conversion device 101, a lens 102, an aperture 103, a barrier 104, a signal processing unit 105, a timing generation unit 111, and a general control/operation unit 110. The imaging device 10 also includes a memory unit 106, a storage medium control interface (I/F) unit 109, and an external I/F unit 107.

The photoelectric conversion device 101 is a solid-state imaging device such as a CMOS image sensor or a CCD image sensor. The photoelectric conversion device 101 is typically a two-dimensional area sensor having a plurality of pixels arranged in a plurality of rows and a plurality of columns, and each of the plurality of pixels outputs a signal corresponding to incident light. The lens 102 forms an optical image of an object in an imaging area of the photoelectric conversion device 101. As described above, the lens 102 may be a lens having a wide angle of view, such as a fisheye lens. The aperture 103 is for varying the amount of light passing through the lens 102. The barrier 104 is for protecting the lens 102.

The signal processing unit 105 performs desired processing, correction, data compression, and the like on the signal output from the photoelectric conversion device 101. The signal processing unit 105 includes a circuit such as a digital signal processor. The signal processing unit 105 may be mounted on the same substrate as the photoelectric conversion device 101 or may be mounted on a different substrate. Alternatively, some functions of the signal processing unit 105 may be mounted on the same substrate as the photoelectric conversion device 101, and other functions of the signal processing unit 105 may be mounted on another substrate. The photoelectric conversion device 101 may output an analog signal before AD conversion instead of the digital signal. In this case, the signal processing unit 105 may further include an AD converter.

The timing generation unit 111 outputs various timing signals to the photoelectric conversion device 101 and the signal processing unit 105. The general control/operation unit 110 is a control unit that controls overall driving and calculation processing of the imaging device 10. Here, a control signal such as a timing signal may be input from the outside of the imaging device 10, and the imaging device 10 may include at least the photoelectric conversion device 101 and the signal processing unit 105 that processes the signal output from the photoelectric conversion device 101.

The memory unit 106 is a frame memory unit for temporarily storing image data. The storage medium control I/F unit 109 is an interface unit for performing storing on the storage medium 108 or reading from the storage medium 108. The external I/F unit 107 is an interface unit for communicating with an external information processing device 20 or the like. The storage medium 108 is a storage medium such as a semiconductor memory for storing or reading imaging data. The storage medium 108 may be built in the imaging device 10 or may be detachable.

Figure 3:
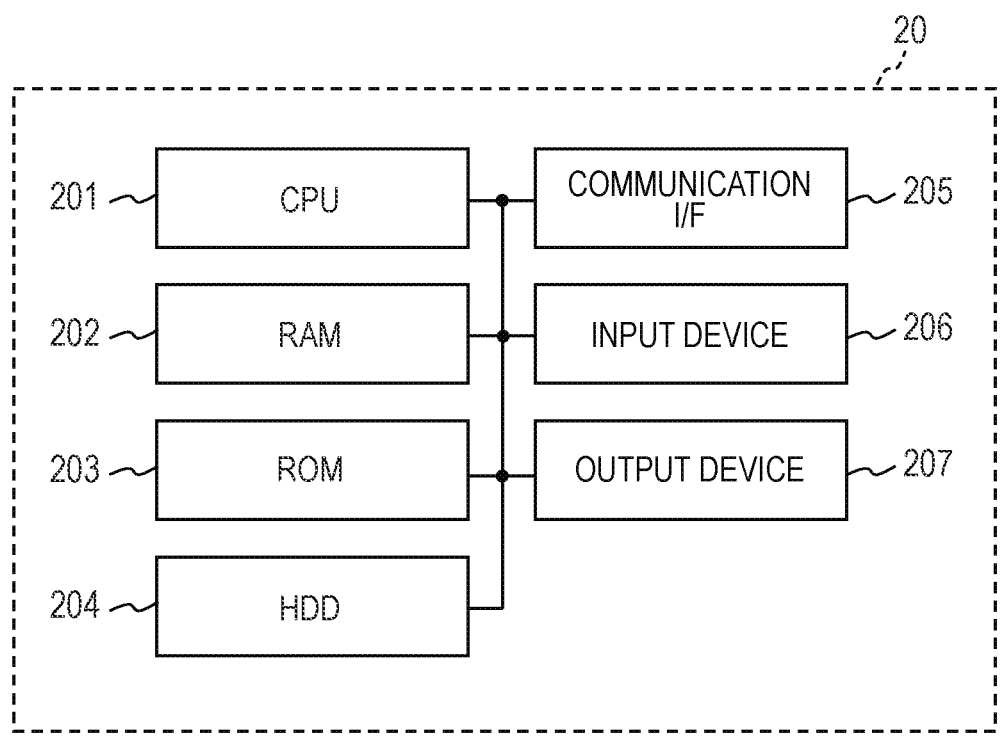
FIG. 3 is a block diagram illustrating a hardware configuration of an information processing device according to the first embodiment.

FIG. 3 is a block diagram illustrating a hardware configuration of the information processing device 20 according to the present embodiment. The information processing device 20 includes a CPU 201, a RAM 202, a ROM 203, a hard disk drive (HDD) 204, a communication I/F 205, an input device 206, and an output device 207. These units are interconnected via a bus or the like.

The CPU 201 is a processor that reads programs stored in the ROM 203 and the HDD 204 into the RAM 202 and executes the programs, and performs calculation processing, control of each unit of the information processing device 20, and the like. The processing performed by the CPU 201 may include generation of a learning model, image recognition, and the like.

The RAM 202 is a volatile storage medium and functions as a work memory when the CPU 201 executes a program. The ROM 203 is a non-volatile storage medium, and stores firmware and the like necessary for the operation of the information processing device 20. The HDD 204 is a non-volatile storage medium, and stores programs, image data, and the like used for learning processing, image recognition, and the like in the present embodiment.

The communication I/F 205 is a communication device based on a standard such as Wi-Fi (registered trademark), Ethernet (registered trademark), or Bluetooth (registered trademark). The communication I/F 205 is used for communication with the imaging device 10, another computer, or the like.

The input device 206 is a device for inputting information to the information processing device 20, and is typically a user interface for a user to operate the information processing device 20. Examples of the input device 206 include a keyboard, buttons, a mouse, and a touch panel.

The output device 207 is a device in which the information processing device 20 outputs information to the outside, and is typically a user interface for presenting information to the user. Examples of the output device 207 include a display and a speaker.

Note that the configuration of the information processing device 20 described above is merely an example, and can be changed as appropriate. Examples of processors that can be mounted on the information processing device 20 include a GPU, an ASIC, and an FPGA in addition to the CPU 201. A plurality of processors may be provided, or a plurality of processors may perform processing in a distributed manner. The function of storing information such as image data in the HDD 204 may be provided not in the information processing device 20 but in another data server. The HDD 204 may be a storage medium such as an optical disk, a magneto-optical disk, or a solid-state drive (SSD).

Figure 4:
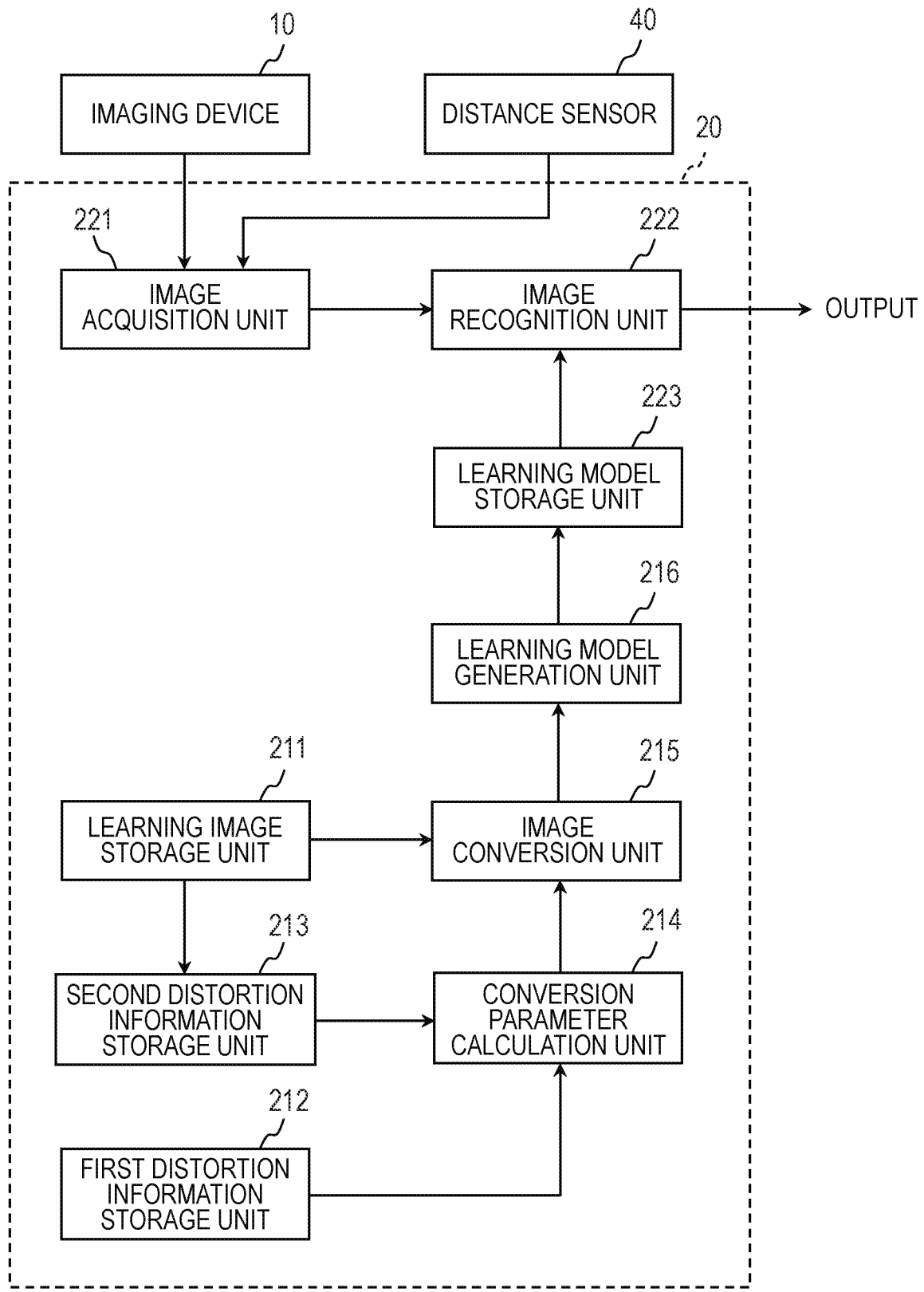
FIG. 4 is a functional block diagram of the information processing device according to the first embodiment.

FIG. 4 is a functional block diagram of the information processing device 20 according to the present embodiment. The information processing device 20 includes a learning image storage unit 211, a first distortion information storage unit 212, a second distortion information storage unit 213, a conversion parameter calculation unit 214, an image conversion unit 215, a learning model generation unit 216, an image acquisition unit 221, an image recognition unit 222, and a learning model storage unit 223.

The CPU 201 executes a program to perform predetermined calculation processing. The CPU 201 controls each unit in the information processing device 20 by executing a program. Through these processes, the CPU 201 realizes the functions of the conversion parameter calculation unit 214, the image conversion unit 215, the learning model generation unit 216, the image acquisition unit 221, and the image recognition unit 222.

The HDD 204 functions as a database for storing learning images, first distortion information, second distortion information, and a learning model. Thus, the HDD 204 functions as the learning image storage unit 211, the first distortion information storage unit 212, the second distortion information storage unit 213, and the learning model storage unit 223.

A part of the functional blocks illustrated in FIG. 4 may be provided in an external device of the information processing device 20, and the functional blocks illustrated in FIG. 4 may be realized by cooperation of a plurality of devices. For example, the functional blocks illustrated in FIG. 4 may be implemented by a learning device and an image recognition device. In this case, the learning device may include the learning image storage unit 211, the first distortion information storage unit 212, the second distortion information storage unit 213, the conversion parameter calculation unit 214, the image conversion unit 215, and the learning model generation unit 216. The image recognition device may include the image acquisition unit 221, the image recognition unit 222, and the learning model storage unit 223. As another modified example, part or all of the functions of the learning image storage unit 211, the first distortion information storage unit 212, the second distortion information storage unit 213, and the learning model storage unit 223 may be realized by a data server external to the information processing device 20.

Figure 5:
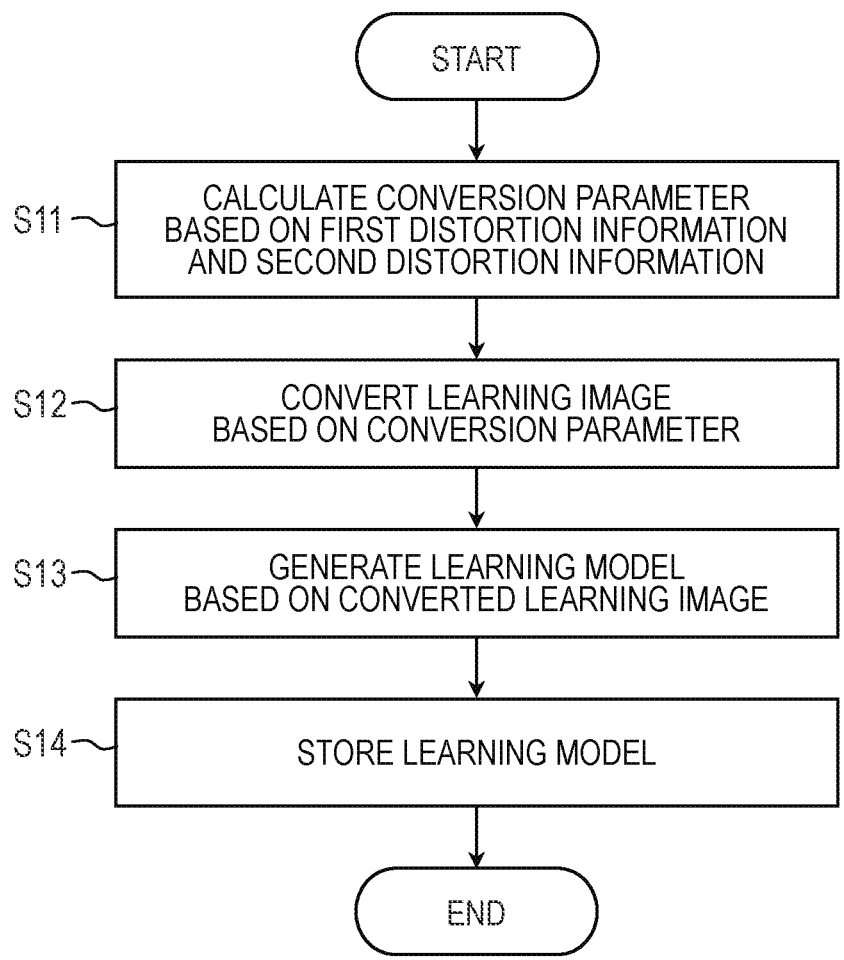
FIG. 5 is a flowchart illustrating an outline of learning processing in the information processing device according to the first embodiment.

FIG. 5 is a flowchart illustrating an outline of learning processing in the information processing device 20 according to the first embodiment. This learning processing is a process of generating a learning model, and is performed in advance based on a start operation or the like by a user prior to the image recognition processing using the learning model. This learning processing may be an additional learning that is performed on an existing learning model in which learning has been completed.

The learning image is stored in advance in the learning image storage unit 211, but the information processing device 20 may acquire the learning image from a database outside the information processing device 20 at the time of learning. The learning image is typically a group of big data including a large number of images obtained by capturing an object to be recognized in various situations. Therefore, the learning image is usually an image captured by an imaging device different from the imaging device 10. When the setting of the related information such as the type of the object is necessary for learning, the related information is stored in the learning image storage unit 211 in association with the learning image in advance. The related information may be, for example, a name of an object included in an image.

In step S11, the conversion parameter calculation unit 214 acquires the first distortion information stored in the first distortion information storage unit 212 and the second distortion information stored in the second distortion information storage unit 213. The conversion parameter calculation unit 214 calculates a conversion parameter based on the first distortion information and the second distortion information.

Here, the first distortion information is information related to a distortion characteristic occurring in an image (a first image) captured by the imaging device 10 due to an optical characteristic (a first optical characteristic) of the optical system of the imaging device 10 (a first imaging device). More specifically, the first distortion information may be information related to distortion of the lens 102 used in the imaging device 10. The first distortion information is stored in advance in the first distortion information storage unit 212 according to the imaging device 10 to be used for image recognition.

The second distortion information is information related to a distortion characteristic occurring in the image due to an optical characteristic (a second optical characteristic) of the optical system of the imaging device (a second imaging device) used for capturing the learning image (a second image). More specifically, the second distortion information may be information related to distortion of the lens of the imaging device used for capturing the learning image. The second distortion information is stored in advance in the second distortion information storage unit 213 in accordance with the learning image used for learning in this process. In this case, the conversion parameter calculation unit 214 may acquire the second distortion information from the learning image storage unit 211.

The conversion parameter generated by the process of this step indicates a mode, a degree, and the like of conversion in image conversion which will be described later. The conversion parameter calculation unit 214 calculates a conversion parameter so that the distortion of the learning image is close to the distortion of the image captured by the imaging device 10. Further, the conversion parameter may include parameters such as a rotation angle of the image, a degree of enlargement/shrink, and a brightness change.

In step S12, the image conversion unit 215 (a conversion unit) acquires the learning image stored in the learning image storage unit 211 and the conversion parameter calculated in step S11. Then, the image conversion unit 215 converts the learning image based on the conversion parameter. Note that the conversion in this process may be, for example, a geometric transformation that performs projection method conversion between lenses having different projection methods. In addition, pixel value complementation processing may be performed at the time of conversion. The number of learning images converted in step S12 may be any number necessary for generating a learning model, which will be described later, and is generally plural.

Figure 6:
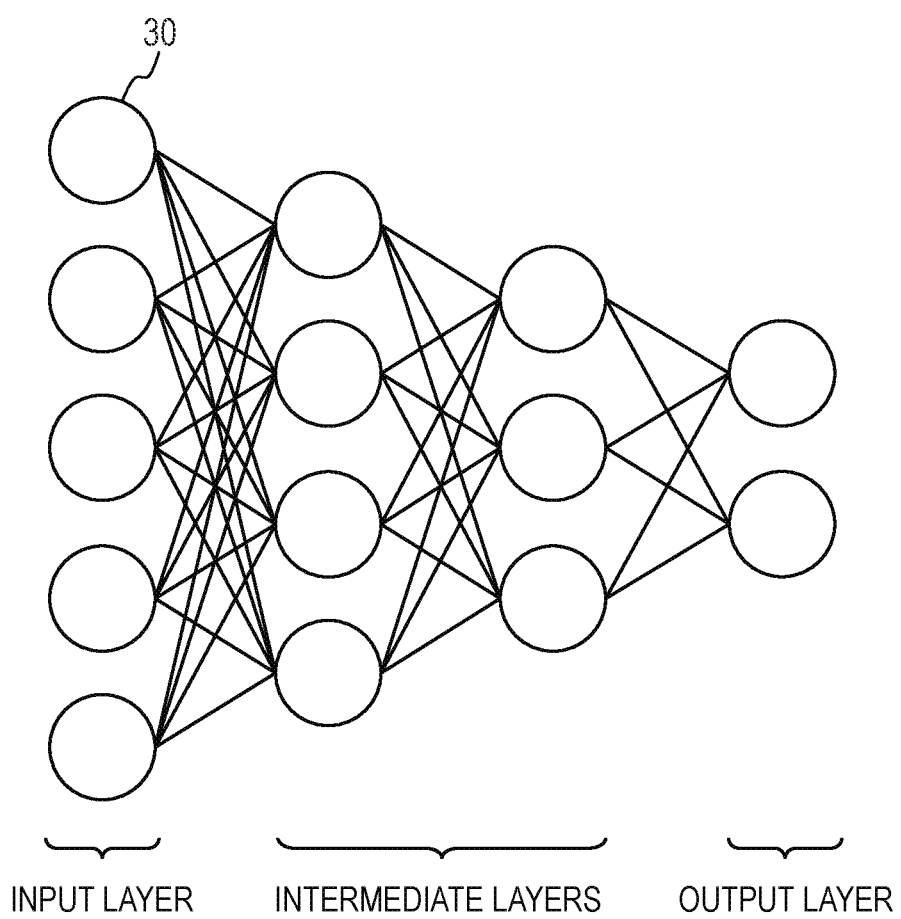
FIG. 6 is a diagram conceptually illustrating a neural network that can be used for image recognition in the information processing device according to the first embodiment.

In step S13, the learning model generation unit 216 (a generation unit) generates a learning model based on the converted learning image (a third image). The learning model that may be used in the present embodiment may be, for example, a neural network as illustrated in FIG. 6. FIG. 6 is a diagram conceptually illustrating a neural network that can be used for image recognition in the information processing device 20 according to the present embodiment.

The neural network illustrated in FIG. 6 has a plurality of nodes 30. The plurality of nodes 30 forms an input layer, intermediate layers, and an output layer. Image data is input to the input layer. Each node 30 performs an operation based on an activation function including input values from a plurality of other nodes 30, weighting coefficients, and bias values, and outputs the operation result to the node 30 in the next layer. The node 30 in the output layer outputs the calculation result of the neural network based on the input from the intermediate layer in the preceding stage. This output may mean any determination result regarding the input image data. Specific examples of the determination result may be, for example, whether or not an object is present in the input image, a position of the object, a type of the object, or the like.

In the example of the neural network, the learning model corresponds to the structure of the neural network and the weighting coefficients and the bias values included in the activation function, and the learning corresponds to appropriately determining the weighting coefficients and the bias values.

An example of a method of learning the neural network will be described. Learning images in which correct answer values are set in advance are prepared. Then, the weighting coefficients and the bias values of the nodes 30 are optimized so that the correct answer values being set in advance are output from the nodes 30 of the output layer when the learning image is input to the input layer. An example of this optimization method is a backpropagation method. By performing such learning processing using a large number of learning images, it is possible to generate a learning model capable of appropriately recognizing an unknown image other than the learning images.

The learning model that can be used in the present embodiment is not limited to a model using a neural network as in the above-described example, and may be, for example, a random forest, a support vector machine, or the like. In addition, the structure of the neural network illustrated in FIG. 6 is simplified for convenience of description, and the actual number of layers, the number of nodes, and the like may be much larger than those illustrated.

In step S14, the learning model storage unit 223 stores the learning model generated in step S13. Next, an image recognition processing using the learned learning model will be described.

Figure 7:
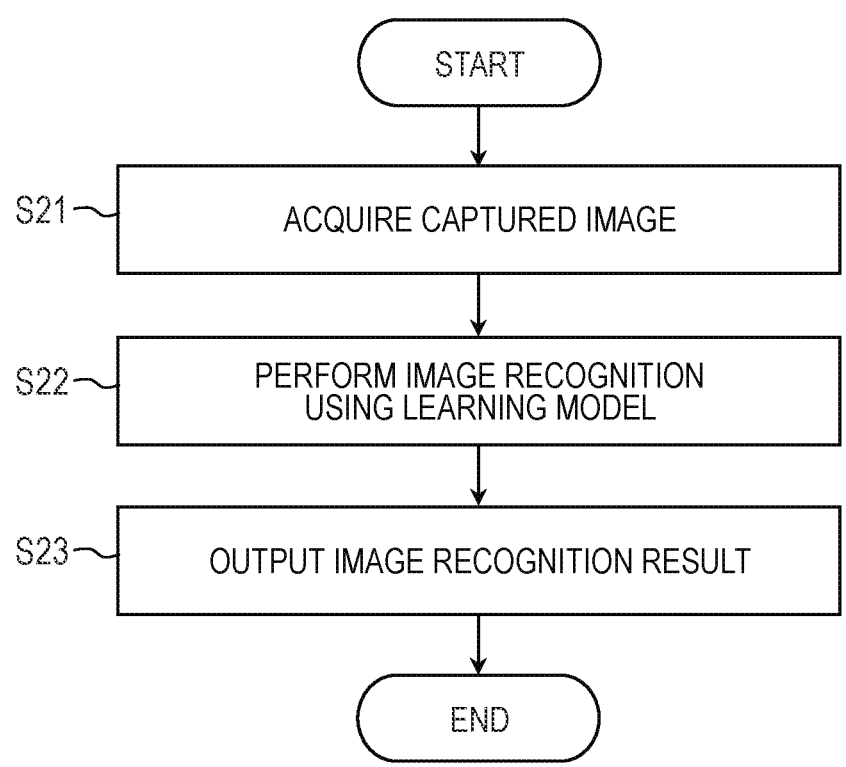
FIG. 7 is a flowchart illustrating an outline of image recognition processing in the information processing device according to the first embodiment.

FIG. 7 is a flowchart illustrating an outline of image recognition processing in the information processing device 20 according to the first embodiment. The image recognition processing is a process of recognizing an image captured by the imaging device 10 using a learning model. When the image recognition system repeatedly performs imaging and recognition like an automatic monitoring system, this process is repeatedly executed every time imaging is performed by the imaging device 10. Alternatively, this process may be executed based on a start operation from the user.

In step S21, the image acquisition unit 221 acquires an image captured by the imaging device 10. In step S22, the image recognition unit 222 recognizes the image acquired in step S21 using the learning model stored in the learning model storage unit 223. For example, when the learning model used by the image recognition unit 222 is a neural network as shown in FIG. 6, this process may be a process in which image data is input to the input layer and the calculation result is output from the output layer. In step S23, the information processing device 20 outputs the calculation result of the image recognition unit 222 to the outside. As illustrated in FIG. 4, the image acquisition unit 221 may further acquire an output of the distance sensor 40 and use the output for processing.

The effect of the learning processing of the present embodiment will be described in more detail. Generally, in order to improve accuracy in machine learning for image recognition, it is effective to prepare many learning images. For this purpose, since there is a limit in the number of images to be obtained in a method in which a large number of images for learning are captured to prepare learning images, it is desirable to use existing images so-called big data or the like. However, if the optical characteristic of the imaging device used for image recognition are different from the optical characteristic of the imaging device used for capturing the learning image, even if the same object is captured by those imaging devices, the objects in the captured images are different in shape and the like, and therefore the accuracy of image recognition may deteriorate. In particular, while a lens having a wide angle of view and a large distortion such as a fisheye lens is often used in an imaging device for use in automatic monitoring or the like, an existing image is often captured by an imaging device using a general lens of a central projection method. In such a case, the influence of the difference in image distortion due to the difference in lens may be significant.

Therefore, in the present embodiment, learning is performed using an image having a distortion characteristic based on the optical characteristic of the optical system of the imaging device 10 used for image recognition by converting the learning image. As a result, learning is performed in consideration of distortion characteristics of images acquired by the imaging device 10. Therefore, according to the present embodiment, an information processing device and an information processing method capable of generating a high-accuracy learning model are provided.

Further, in the present embodiment, in addition to the optical characteristic of the optical system of the imaging device 10 used for image recognition, the optical characteristic of the optical system of the imaging device that captures the learning image are also considered at the time of conversion. Therefore, learning is performed in consideration of the difference in distortion characteristics between the learning image and the image acquired by the imaging device 10. This further improves the accuracy of the learning model.

Second Embodiment

An image recognition system of the present embodiment differs from that of the first embodiment in that, in the learning process, a plurality of different conversions are performed on one learning image according to the region of the lens. That is, in the present embodiment, a plurality of converted learning images having different distortion characteristics are generated. Hereinafter, differences from the first embodiment will be described, and description of portions common to the first embodiment will be omitted or simplified.

Figure 8:
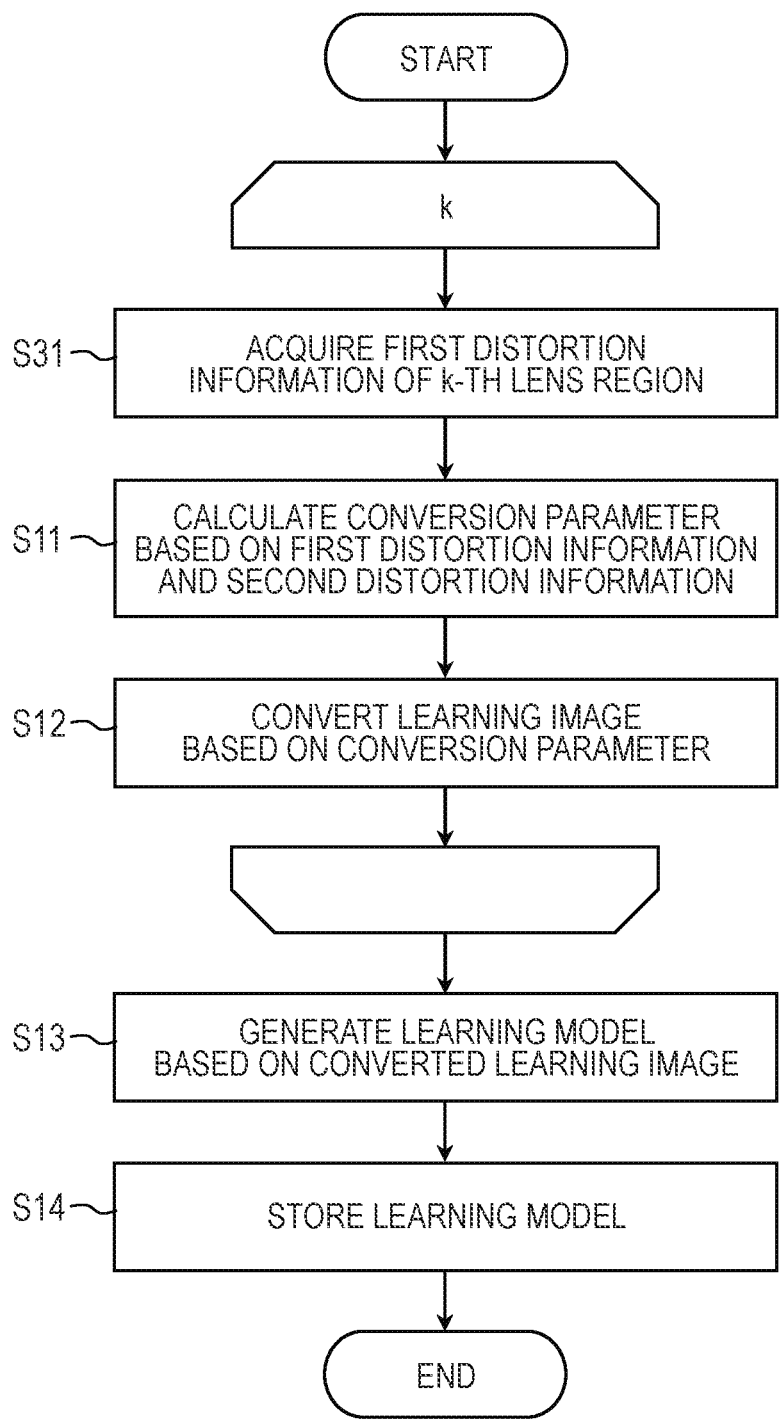
FIG. 8 is a flowchart illustrating an outline of learning processing in an information processing device according to a second embodiment.

FIG. 8 is a flowchart illustrating an outline of learning processing in the information processing device according to the second embodiment. The learning processing of the present embodiment includes a loop process in which the lens 102 is divided into a plurality of regions, and a corresponding learning image is converted for each region of the lens 102. This loop process includes steps S31, S11, and S12. Each time one cycle of the loop process is performed, the learning image corresponding to one area is converted. Let "k" be the loop counter variable of the loop process.

In step S31, the conversion parameter calculation unit 214 acquires the first distortion information corresponding to the k-th lens region of the plurality of regions of the lens 102 from the first distortion information storage unit 212. The first distortion information may be different for each lens region. It is assumed that the first distortion information for each lens region is stored in advance in the first distortion information storage unit 212, but the first distortion information may be calculated from the theoretical formula indicating the projection method of the lens and the coordinates of the lens region when calculating the conversion parameter.

Steps S11 and S12 are the same as those of the first embodiment except that the first distortion information corresponds not to the entire lens 102 but to the k-th lens region which is a part of the lens 102. When the conversion of all the lens areas is completed, the loop process ends. In this loop processing, conversion processing is performed on one learning image by the number of lens regions, and learning images converted by the number of lens regions are obtained. Thereafter, similar to the first embodiment, the processes of steps S13 and S14 are performed. By these processes, conversion is performed using different first distortion information corresponding to each of the plurality of regions of the lens 102, and a learning model is generated by a large number of learning images corresponding to the respective conversions.

The conversion processing for each lens region according to the present embodiment will be described in more detail with reference to a specific example. FIGS. 9A to 9F are diagrams illustrating an example of image conversion in the information processing device 20 according to the second embodiment. In the description of this specific example, it is assumed that the lens 102 of the imaging device 10 is a fisheye lens having an angle of view of 180° by a projection method such as an equisolid angle projection method. Further, it is assumed that the learning image is captured by an imaging device using a lens based on a projection method of a central projection method in which an object and an image have a similar shape.

Figure 9A:
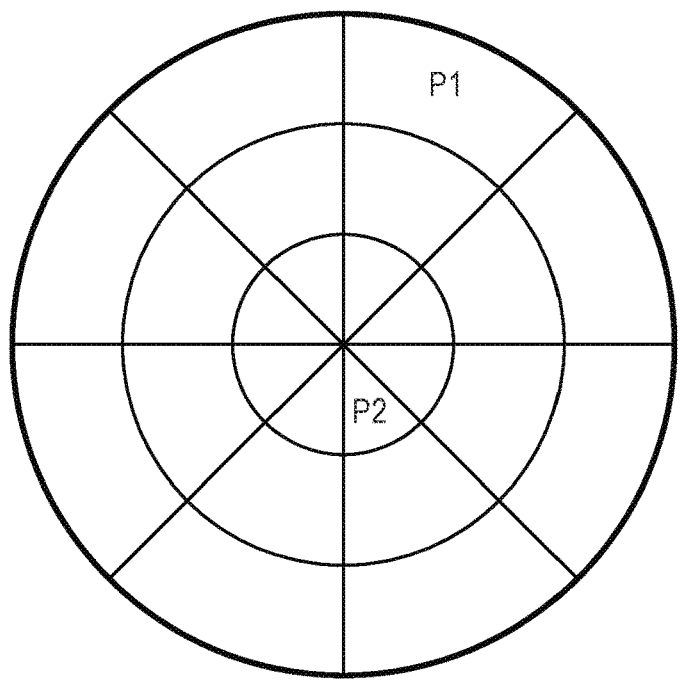
FIG. 9A, FIG. 9B, FIG. 9C, FIG. 9D, FIG. 9E and FIG. 9F are diagrams illustrating an example of image conversion in the information processing device according to the second embodiment.

FIG. 9A is a diagram schematically illustrating an image captured by the imaging device 10 using a fisheye lens and a dividing method thereof. When the optical axis of the fisheye lens is oriented in the vertical direction, the imaging range is the entire surface of the celestial sphere. At this time, the coordinates of each pixel of the captured image are obtained by projecting the coordinates of the entire surface of the celestial sphere onto a circle on the plane. Due to this projection method, the distortion of the object in the captured image is larger at a position closer to the ground surface of the celestial sphere (a position closer to the outer periphery of the circle in FIG. 9A), and is smaller at a position closer to the zenith (a position closer to the center of the circle in FIG. 9A). The image of the object is rotated at a different angle depending on the position in the captured image. Thus, as illustrated in FIG. 9A, a region is divided by a plurality of center lines and a plurality of concentric circles. The range of the lens corresponding to each region in the image illustrated in FIG. 9A corresponds to the lens region described in FIG. 8.

Figure 9B:
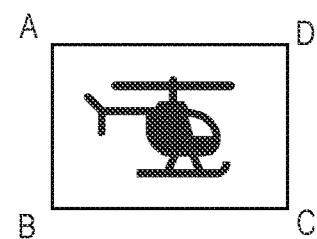

Next, with reference to FIGS. 9B to 9F, the deformation of the image by the conversion process of the learning image will be described. FIG. 9B illustrates an example of a learning image before conversion. The image of FIG. 9B is a rectangular ABCD including an image of a flying object as a recognition target. In the image of FIG. 9B, it is assumed that the actual shape of the flying object is correctly reflected because the subject and the image have similar shapes.

Figure 9C:
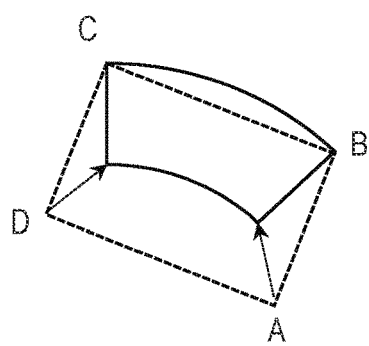
Figure 9D:

FIG. 9C is a diagram illustrating deformation of the learning image corresponding to the region P1 in FIG. 9A. FIG. 9D is a diagram illustrating the deformation of the image of the flying object caused by the deformation of the learning image. In the region P1, when the rectangular ABCD is converted from the central projection method to the equisolid angle projection method, the rectangular ABCD is subjected to a rotation of about 158° and deformation in which each side is distorted, as illustrated in FIG. 9C. Thus, as illustrated in FIG. 9D, the shape of the image of the flying object is also subjected to the same rotation and deformation.

Figure 9E:
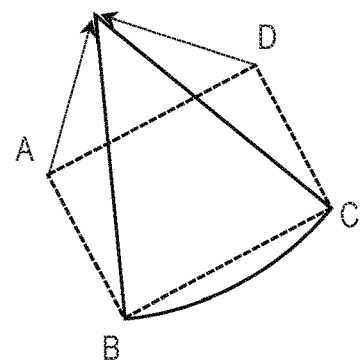
Figure 9F:

FIG. 9E is a diagram illustrating deformation of the learning image corresponding to the region P2 in FIG. 9A. FIG. 9F is a diagram illustrating the deformation of the image of the flying object caused by the deformation of the learning image. In the region P2, when the rectangular ABCD is converted from the central projection method to the equisolid angle projection method, the rectangular ABCD is subjected to a rotation of about 23° and a deformation from the rectangle to the fan shape as illustrated in FIG. 9E. Thus, as illustrated in FIG. 9F, the shape of the image of the flying object is also subjected to the same rotation and deformation. As can be understood from the comparison between FIG. 9D and FIG. 9F, the degree of deformation differs depending on the region.

In the case of capturing the image of the object such as the flying object using the fisheye lens, it should be considered that the mode and degree of deformation of the image change depending on the position in the image due to the nature of a projection method such as the equisolid angle projection method. It is difficult to take this effect into account for deformations that give the same distortion across the entire positions of the fisheye lens. Therefore, in the present embodiment, in the conversion of the learning image in steps S11 and S12, the conversion parameter is made different depending on the position in the image, that is, the position of the lens region, thereby making it possible to perform the conversion in consideration of the difference between the deformation mode and the degree depending on the position in the lens. Therefore, according to the present embodiment, it is possible to provide an information processing device and an information processing method capable of generating a learning model with higher accuracy.

Third Embodiment

An image recognition system of the present embodiment differs from the second embodiment in that, in the learning processing, a plurality of learning models are generated using images obtained by a plurality of different conversions corresponding to lens regions. Hereinafter, differences from the second embodiment will be described, and description of portions common to the second embodiment will be omitted or simplified.

FIG. 10 is a flowchart illustrating an outline of learning processing in the information processing device according to the third embodiment. The learning processing of the present embodiment includes a loop process of dividing the lens 102 into a plurality of areas, converting a learning image corresponding to each area of the lens 102, and generating a learning model corresponding to the learning image. This loop process includes steps S31, S11, S12, S13, and S14. Each time one cycle of the loop process is performed, the learning image corresponding to one area is converted and the learning model is generated. Let "k" be the loop counter variable of the loop process.

The specific contents of steps S31, S11, S12, S13, and S14 are substantially the same as those of the second embodiment, and therefore the description thereof will be omitted. Unlike the second embodiment, in the present embodiment, steps S13 and S14 are also included in the loop process. Thus, in the present embodiment, a plurality of learning models corresponding to the lens regions are generated.

The image recognition processing differs from the first embodiment in that image recognition is performed using different learning models for each lens region in step S22 in FIG. 7, but the other points are the same. Note that this image recognition is performed a plurality of times because it is performed for each lens region, but this plurality of processes may be serial processing, parallel processing, or a combination of serial processing and parallel processing.

As described above, in the present embodiment, as in the second embodiment, the conversion parameter is changed depending on the position of the lens region, so that the conversion is performed in consideration of the difference from the above-described deformation mode. Therefore, the same effect as that of the second embodiment can be obtained. Further, in the present embodiment, since different learning models are generated for regions, when each of the plurality of learning models is individually viewed, a learning image of another region is not used for learning. Therefore, the recognition accuracy of the learning model is improved. Therefore, according to the present embodiment, it is possible to provide an information processing device and an information processing method capable of generating a learning model with higher accuracy.

In the present embodiment, since there are individual learning models divided for regions, it is also possible to perform a process in which image recognition is not performed in some regions instead of performing image recognition over the entire regions of the lens 102. For example, in a case where there is a range in which it is known that there is no object to be identified within the imaging range of the imaging device 10, a learning model may be prepared only in a region excluding the region without the object, and image recognition may be performed by skipping the region without the object at the time of image recognition. In this method, since the image recognition of a part of the regions can be omitted, the processing load can be reduced. The region in which image recognition is skipped may be selected in advance, or may be selected as a region in which there is no difference by detecting a difference from a past image.

Fourth Embodiment

Figure 11A:
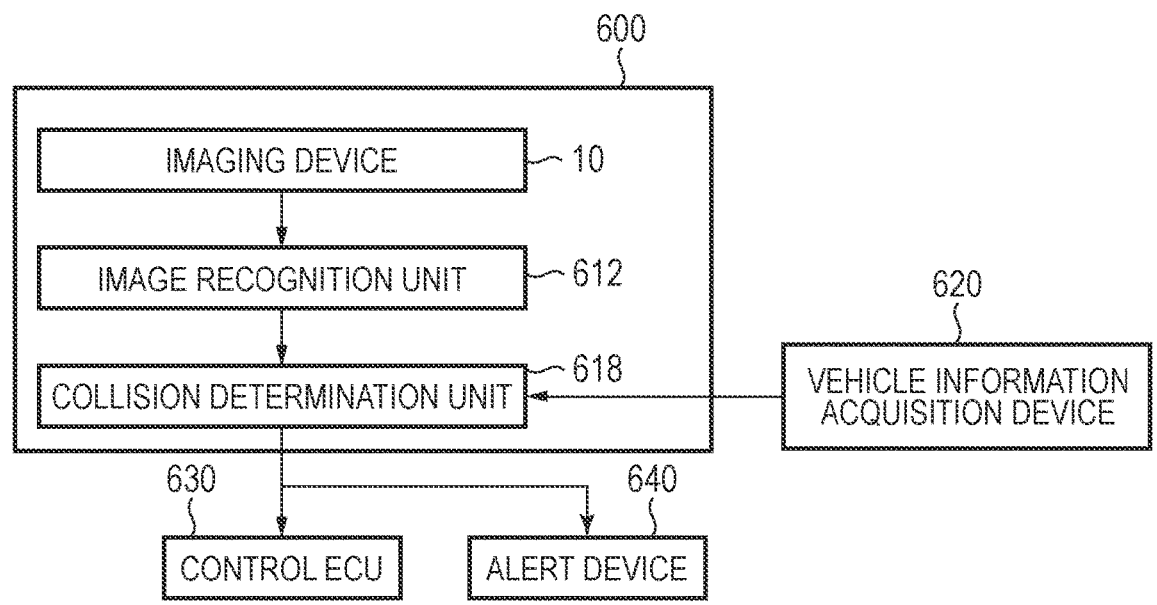
FIG. 11A and FIG. 11B are diagrams illustrating a configuration example of an image recognition system and a moving body according to a fourth embodiment.
Figure 11B:
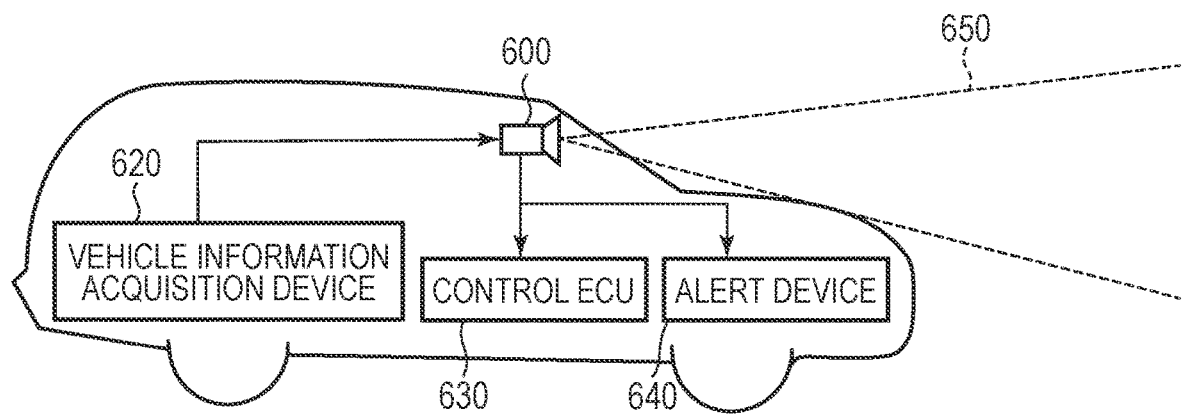

An image recognition system and a moving body according to a fourth embodiment of the present disclosure will be described with reference to FIGS. 11A and 11B. FIGS. 11A and 11B are diagrams illustrating configurations of an image recognition system 600 and a moving body according to the present embodiment.

FIG. 11A is a block diagram illustrating an example of an image recognition system 600 related to an in-vehicle camera. The image recognition system 600 includes the imaging device 10 described in the first to third embodiments. The image recognition system 600 includes an image recognition unit 612 that includes a learning model generated by the information processing device 20 described in the first to third embodiments and performs image recognition on an image captured by the imaging device 10. Here, the output result of the image recognition performed by the image recognition unit 612 is information related to the possibility of collision with the object. For example, the image recognition system 600 includes the distance sensor 40 separately from the imaging device 10, and inputs the result of the distance sensor 40 and the result of the imaging device 10 to the image recognition unit 612. The image recognition unit 612 merges the two results. Then, the image recognition system 600 can take an optimal avoidance action.

The image recognition system 600 includes a collision determination unit 618 that determines whether there is a possibility of collision based on the distance calculated by the image recognition unit 612. The image recognition unit 612 is an example of a distance information acquisition means (or a distance information acquisition circuit) that acquires distance information to an object. That is, the distance information is information related to parallax, defocus amount, distance to an object, and the like.

The collision determination unit 618 may determine the possibility of collision using any of the distance information. The distance information acquisition means may be realized by dedicated hardware, a software module, or a combination thereof. Alternatively, it may be realized by an FPGA, an ASIC, or the like. Further, it may be realized by a combination of these.

The image recognition system 600 is connected to the vehicle information acquisition device 620, and can acquire vehicle information such as a vehicle speed, a yaw rate, and a steering angle. The image recognition system 600 is also connected to a control ECU 630, which is control means (control circuit) that outputs a control signal for generating braking force to the vehicle based on the determination result obtained by the collision determination unit 618.

The image recognition system 600 is also connected to an alert device 640 that issues an alarm to the driver based on the determination result of the collision determination unit 618. For example, when the possibility of collision is high as the determination result of the collision determination unit 618, the control ECU 630 performs vehicle control for avoiding collision and reducing damage by applying a brake, pushing back an accelerator, suppressing engine power, or the like. The alert device 640 sounds an alarm such as a sound, displays alarm information on a screen of a car navigation system or the like, and applies vibration to a seatbelt or a steering wheel, thereby warning the user.

In the present embodiment, the imaging device 10 of the image recognition system 600 captures an image of the periphery of the vehicle, for example, the front or the rear. FIG. 11B illustrates an image recognition system 600 when capturing an image of the front of the vehicle (image capturing range 650). The vehicle information acquisition device 620 sends an instruction to the image recognition system 600 or the imaging device 10 to perform a predetermined operation. With such a configuration, the accuracy of distance measurement can be further improved. The vehicle may further include control means for controlling the vehicle, which is a moving body, based on the distance information.

In the above-described example, the control that does not collide with another vehicle has been described, but the image recognition system 600 can also be applied to a control for performing automatic driving to follow another vehicle, a control for performing automatic driving so as not to go out of a traffic lane, or the like. Further, the image recognition system 600 can be applied not only to a vehicle but also to a moving body (moving device) such as a ship, an aircraft, or an industrial robot. In addition, the present invention can be applied not only to a moving body but also to a device using object recognition in a wide range such as an intelligent transportation system (ITS).

According to the present embodiment, by using the image recognition unit 612 having a high-accuracy learning model, the image recognition system 600 and the moving body with higher performance can be provided.

Modified Embodiments

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is also one of the embodiments of the present invention.

In the second embodiment described above, a fisheye lens of an equisolid angle projection method is exemplified as an example of the lens 102 of the imaging device 10, but the projection method is not limited to this. The projection method may be, for example, an equidistance projection method, an orthographic projection method, a stereoscopic projection method, or the like.

In the description of the above-described embodiment, it is assumed that the learning image is captured by an imaging device different from the imaging device 10, but an image captured by the imaging device 10 may be included in a part of the learning images. For example, when the image recognition system of the embodiments is operated, an image captured by the imaging device 10 may be added to the learning images. In these cases, image conversion processing is not essential for this image.

The present disclosure provides an information processing device and an information processing method capable of reducing a processing load and generating a high-accuracy learning model.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155371, filed Sep. 16, 2020, which is hereby incorporated by reference herein in its entirety.

What is claimed is:

1. An information processing device configured to generate a learning model for performing image recognition on a first image acquired by a first imaging device, wherein the first imaging device includes an optical system having a first optical characteristic, the information processing device comprising:
a conversion unit configured to convert a second image for learning to generate a third image having a distortion characteristic based on the first optical characteristic;
a generation unit configured to generate the learning model based on the third image; and
an image recognition unit configure to perform the image recognition on the first image,
wherein the second image is an image acquired by a second imaging device including an optical system having a second optical characteristic different from the first optical characteristic,
wherein the conversion unit generates a plurality of the third images having distortion characteristics different from each other,
wherein each of the plurality of third images has a distortion characteristic corresponding to a position in the first image,
wherein the generation unit generates a plurality of the learning models corresponding to positions in the first image based on the plurality of third images, and wherein the image recognition unit skips at least one of the plurality of the learning models to omit the image recognition on a part of regions of the first image.

2. The information processing device according to claim 1, wherein the conversion unit converts a distortion characteristic of the second image further based on the second optical characteristic.

3. The information processing device according to claim 1, wherein the optical system of the first imaging device includes a fisheye lens.

4. The information processing device according to claim 1, wherein a conversion process performed by the conversion unit includes a geometric transformation that converts a projection method of the second image.

5. An image recognition system comprising:
an image recognition device having a learning model generated by the information processing device according to claim 1; and
the first imaging device.

6. A moving body comprising:
an image recognition device having a learning model generated by the information processing device according to claim 1; and
a control unit configured to control the moving body based on a result of an image recognition performed by the image recognition device.

7. An information processing method for generating a learning model for performing image recognition on a first image acquired by a first imaging device, wherein the first imaging device includes an optical system having a first optical characteristic, the method comprising:
converting a second image for learning to generate a third image having a distortion characteristic based on the first optical characteristic;
generating the learning model based on the third image; and
performing the image recognition on the first image,
wherein the second image is an image acquired by a second imaging device including an optical system having a second optical characteristic different from the first optical characteristic,
wherein a plurality of the third images having distortion characteristics different from each other are generated,
wherein each of the plurality of third images has a distortion characteristic corresponding to a position in the first image,
wherein a plurality of the learning models are generated corresponding to positions in the first image based on the plurality of third images, and
wherein at least one of the plurality of the learning models is skipped to omit the image recognition on a part of regions of the first image.

8. A non-transitory storage medium storing a program that causes a computer to perform the image processing method according to claim 7.

* * * * *